Patented June 1, 1954

2,680,075

UNITED STATES PATENT OFFICE 2,680,075

FOOD PRODUCT FOR ANIMALS

Max A. Landau, New York, N. Y., assignor to Leon Lewkowicz, New York, N. Y.

No Drawing. Application July 21, 1950,
Serial No. 175,298

6 Claims. (Cl. 99—7)

This invention relates to new and improved food products for animals and it has particular relation to food products containing gelatin protein in combination with milk protein. The invention also relates to a process for preparing said food products.

The main object of my present invention is to provide a food product for animals which contains the raw materials needed in the metabolism of the animal body for providing all necessary amino acids and other substances for the synthesis of proteins in the animal body.

Another object of the present invention is to provide a food product for animals which has a high nutritive value, is stable on storage and has a pleasant taste. Further objects and the advantages of the invention will be apparent from the appended claims and the following specification which describes by way of example some embodiments of the invention.

In preparing gelatin proteins used in carrying out my present invention, I use fresh and still wet bones as starting material. The fresh bones are introduced into an autoclave preferably together with some water and are treated in the autoclave with steam. I prefer the use of saturated steam of for example 3 to 8 atmospheres superatmospheric pressure. The treatment of the bones with steam is preferably continued until the fat is recovered and the bulk of gelatin and related organic substances is extracted, for example for about 3 hours. I have obtained good results by starting the treatment with steam at a low pressure, for example 2 to 4 atmospheres, and increasing the steam pressure as the treatment proceeds. However, the treatment with steam may also be carried out by applying a uniform steam pressure during the entire period of steam treatment.

By the end of the treatment with steam, the autoclave contains an aqueous gelatin solution consisting of gelatin and related substances extracted from the bones dissolved in condensed steam and the water introduced into the autoclave at the beginning of the steam treatment. The fat of the bones, which is also recovered by the treatment with steam, swims on the surface of the aqueous gelatin solution. This solution is removed from the autoclave and collected in a florentine receiver in which the liquid fat is separated from the aqueous solution. Separation and recovery of the fat may be effected also by other means, for example by centrifuging. The fat recovered in this manner can be subjected to a refining treatment and used as a food product or it can be used without the application of a refining treatment as a raw material in the manufacture of soap or in other technical applications.

After the treatment with steam the bones are removed from the autoclave, dried, comminuted and finally pulverized. They represent a commercially valuable product containing easily assimilable calcium phosphate on the one hand and nitrogen-containing substances on the other hand and may be used either as a fertilizer or as an addition of mineralic character to fodder.

The gelatin solution recovered in the above described manner is subjected to evaporation, for example in vacuo in an evaporator containing a system of tubes through which steam is passed as a heating medium. The evaporation is continued up to a concentration at which the concentrated solution easily solidifies at ordinary room temperature, for example up to a concentration of 15–30% by weight, based on the total weight of the solution.

I have found that solidification of the concentrated gelatin solution at room temperature is facilitated by the addition of a small amount of aqueous formaldehyde solution to the concentrated gelatin solution prior to its solidification. I use a 30% aqueous formaldehyde solution in an amount of 0.1–0.5% by weight based on the weight of the gelatin present in the solution. This corresponds to 0.03 to 0.15% by weight of $CH_2O$. It is essential that the formaldehyde is added to the gelatin solution after its concentration. For example I add 0.25% of a 30% aqueous formaldehyde solution to the concentrated gelatin solution. In order to obtain uniform distribution of the formaldehyde in the gelatin solution, I dilute the formaldehyde solution, before adding it to the gelatin solution, with water and add the diluted solution under stirring. I have found that a dilute formaldehyde solution obtained from 1 part by weight of the 30% aqueous formaldehyde solution and 9 parts by weight of water gives satisfactory results.

It has been found that the addition of formaldehyde in the above described manner has the beneficial effect of facilitating the solidification of the gelatin solution on the one hand, while on the other hand it has a preserving effect on the gelatin by protecting it from infection by molds, fungi, bacteria or the like. I have found that if the before-mentioned amount of formaldehyde solution is used in dilute condition and is homogeneously mixed with the gelatin solution, substantially no precipitating or other harmful effect of the formaldehyde on the dissolved gelatin occurs.

The concentrated gelatin solution is now poured into trays or similar flat containers for example in layers of ¼ to 3 inches thickness and is kept there at ordinary room temperature or under cooling below that temperature until it solidifies. The solidified gelatin is cut to preferably thin slices of, for example, ⅛ to ¼ inch by means of any suitable cutting device known from the art of manufacturing gelatin and/or glue and the slices are dried in a stream of moving air of suitable temperature such as 20° to 30° C.

After drying, the gelatin sheets are comminuted to form small flakes of suitable shape and dimensions for example substantially flakes of circular or other shape having an average diameter of ⅛″–¼″. This flaky material is mixed with acid casein which has been previously treated in a manner known per se with sodium bicarbonate, preferably in the proportion of 2 parts by weight of the flakes to 1 part by weight of casein. I have found that the addition of a small amount of a triphosphate, i. e. a salt of the acid of the formula

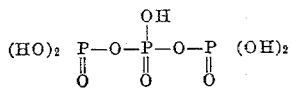

increases the stability of the mixture on storage. For example, additions of 0.1–1.0% by weight of sodium or potassium triphosphate, based on the total weight of the mixture, proved satisfactory. Finaly about 0.1% of sweet fennel oil or another suitable essential oil is added to the mixture.

In carrying out my invention, it is essential that only substantially fresh bones are used as starting material and that these bones are extracted with steam under pressure without any previous treatment, particularly without previous extraction of the bones by means of an organic solvent. Another essential step in my process is the use of formaldehyde in a small amount in the above described manner, i. e. without the formation of water-insoluble products. As mentioned above, the formaldehyde acts as an accelerator of gelling and a preserving agent and contributes to the obtaining of a durable food product of fresh, clean taste.

*Example 1.*—2 parts by weight of the solid comminuted flaky gelatin prepared in the above described manner are mixed thoroughly in dry condition with one part by weight of acid casein treated with sodium bicarbonate, until a homogeneous mixture is formed. During mixing 0.25% by weight of sodium triphosphate and 0.1% by weight, based on the amount of the total mixture, of sweet fennel oil is added which is also homogeneously distributed in the mixture.

*Example 2.*—3 parts by weight of solid, dry, comminuted gelatin obtained in the above described manner are thoroughly mixed with 1 part by weight of acid casein treated in the usual manner with sodium bicarbonate, 0.5% potassium triphosphate and with 0.1% of sweet fennel oil, until a homogeneous mixture is obtained.

*Example 3.*—A mixture containing gelatin and casein is prepared in the manner described in Example 1 by mixing 2 parts by weight of solid gelatin with 1.5 parts by weight of the casein, and 0.25% sodium triphosphate.

It is to be understood that the term "acid casein treated with sodium bicarbonate" is used in the present specification and claims to denote casein obtained by precipitation with acid and subsequent conversion in a manner known by itself, into soluble condition by the action of $NaHCO_3$.

I have found that owing to the use of gelatin obtained in the above described manner from untreated, fresh, wet bones, i. e. bones which have neither been previously extracted by an organic solvent, nor subjected to a preliminary treatment with $SO_2$ or any other treatment, the gelatin is utilized in the product of my invention without any harmful decomposition and forms with the casein a stable, valuable nutritive combination which is easily and completely assimilated by the animal organism. The use of limited amounts of formaldehyde and the use of the gelatin in mixture with the comminuted casein, contributes to the formation of a combined protein product of high value and stability.

It will be understood that my present invention is not limited to the specific details and steps described above and may be carried out with various modifications. For example extraction of the bones by means of steam may be carried out in 2 or more steps, for example in 2 steps, in the first of which the bones are treated at a superatmospheric pressure of 2 atmospheres, while in the second step the treatment is carried out under a superatmospheric steam pressure of 5 atmospheres. Of course, other pressures may also be applied, if desired. To the extracted and dried bones other substances may be added in order to increase their value as a fertilizer or as an admixture to fodder. Cutting of the solidified gelatin to slices may be effected by a knife or by conventional glue-cutting machines provided with a plurality of blades which cut a plurality of slices simultaneously. Drying of the slices may take place for example in a tunnel-type drier provided with means for moving air through the tunnel or in any other suitable drier and the gelatin solution may be evaporated to dryness in any suitable device, for example in a drum-dryer. Finally comminution of the dried gelatin and its mixing with casein and essential oil may take place simultaneously or in subsequent steps of comminuting and mixing. Furthermore, instead of the sweet fennel oil, other flavoring agents, for example oil of peppermint or oil of clover, may be used. Other known organic or inorganic food products may be added to the product of my invention, if desired. These and other modifications may be made without departing from the scope of my invention as defined in the appended claims.

What I claim is:

1. A new improved food product for animals comprising solid gelatin extracted from untreated fresh wet bones, said gelatin being in the form of flakes and containing about 0.03 to 0.15% formaldehyde based on the weight of dry gelatin in mixture with comminuted acid casein treated with sodium bicarbonate and with sweet fennel oil as flavoring agent.

2. A process for preparing a new and improved food product for animals comprising recovering gelatin and fat from untreated fresh wet bones by the action of steam on the bones, separating the fat from said solution, concentrating the latter, mixing the concentrated solution with about 0.03–0.15% by weight of formaldehyde based on the weight of the said gelatin, converting the gelatin solution into dry flakes and mixing the latter with acid casein treated with sodium bicarbonate and adding an essential oil as flavoring agent.

3. A process for preparing a new and improved food product for animals comprising recovering gelatin and fat from untreated fresh wet bones by the action of steam on the bones, separating the fat from said solution, concentrating the latter under vacuum, mixing the concentrated solution with about 0.03–0.15% by weight of formaldehyde based on the weight of the solid gelatin, solidifying and drying the gelatin solution to sheets, comminuting it to flakes and mixing the latter with comminuted acid casein treated with sodium bicarbonate and adding an essential oil as flavoring agent.

4. A process for preparing a new and improved food product for animals comprising recovering gelatin and fat from untreated fresh wet bones by the action of steam on the bones, separating the fat from said solution, concentrating the latter, mixing the concentrated solution with about 0.03–0.15% by weight of formaldehyde based on the weight of the solid gelatin, solidifying and converting the gelatin solution into dry flakes and mixing about two parts by weight of the latter with about one part by weight of acid casein treated with sodium bicarbonate and adding an essential oil as flavoring agent.

5. A process for preparing a new and improved food product for animals comprising recovering gelatin and fat from untreated fresh wet bones by the action of steam on the bones, separating the fat from said solution, concentrating the latter, mixing the concentrated solution with about 0.03–0.15% by weight of formaldehyde based on the weight of the solid gelatin, converting the gelatin solution into dry flakes and mixing about two parts by weight of the latter with one part by weight of comminuted acid casein treated with sodium bicarbonate and adding sweet fennel oil as flavoring agent.

6. A new improved food product for animals consisting of a substantially water-soluble mixture of acid casein treated with sodium bicarbonate, solid gelatin flakes extracted from untreated fresh wet bones and containing formaldehyde as preserving agent and an essential oil as flavoring agent, the proportion by weight of casein to gelatin being about 1:2.

References Cited in the file of this patent

UNITED STATES PATENTS

| Number | Name | Date |
|---|---|---|
| 2,024,683 | Epstein | Dec. 17, 1935 |
| 2,346,380 | Urbain | Apr. 18, 1944 |

FOREIGN PATENTS

| Number | Country | Date |
|---|---|---|
| 22,952 | Great Britain | of 1904 |

OTHER REFERENCES

"Food and Food Products," by Jacobs 1944, pages 683 and 684.